United States Patent [19]
Caldwell

[11] Patent Number: 5,588,243
[45] Date of Patent: Dec. 31, 1996

[54] FISHING LINE DEVICE

[76] Inventor: Gregory Caldwell, 3701 Buttonwood La., Carmel, N.Y. 10512

[21] Appl. No.: 417,678

[22] Filed: Apr. 6, 1995

[51] Int. Cl.$^6$ ..................................................... A01K 97/00
[52] U.S. Cl. ................... 43/4; 43/19.2; 43/17.2
[58] Field of Search ................... 43/4, 19.2, 18.1, 43/27.2, 27.4, 43.12, 17.2

[56] References Cited

U.S. PATENT DOCUMENTS

| | | | |
|---|---|---|---|
| 2,448,864 | 9/1948 | Crandall | 43/6 |
| 2,643,478 | 6/1953 | Paulsen | 43/27.4 X |
| 2,861,377 | 11/1958 | Childress | 43/17.2 |

*Primary Examiner*—Richard K. Seidel
*Assistant Examiner*—Jeanne M. Elpel
*Attorney, Agent, or Firm*—Martin J. Spellman, Jr.

[57] ABSTRACT

A device for transmitting irregular jerking or darting motions to the end of a fishing line from a boat propelled by an oar including apparatus for securing a modified downrigger release clamp to a pulley line suspended between the end of a row boar oar and a bracket adjacent to the handle of the oar. An attachment at the end of the oar comprises two opposed clamping members with resilient pads on the inner faces thereof and an extension arm on one of them projecting outwardly and rearwardly from the end thereof. Apertures at the end of the extension arm have a pulley line therethrough and through a bracket secured adjacent the oar handle which has an outwardly extending end portion through which the pulley line is fixed. The line has crimps therein for holding a downrigger release clamp in place thereon. Through the action of the present apparatus a repetitive jerky line motion is imparted to the fishing line held by the downrigger release clamp.

2 Claims, 3 Drawing Sheets

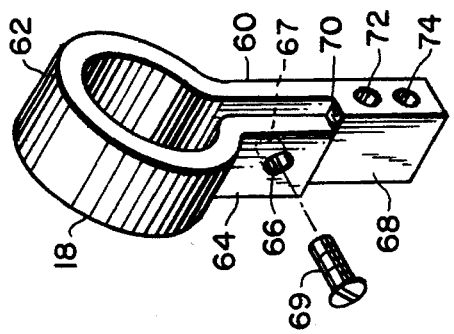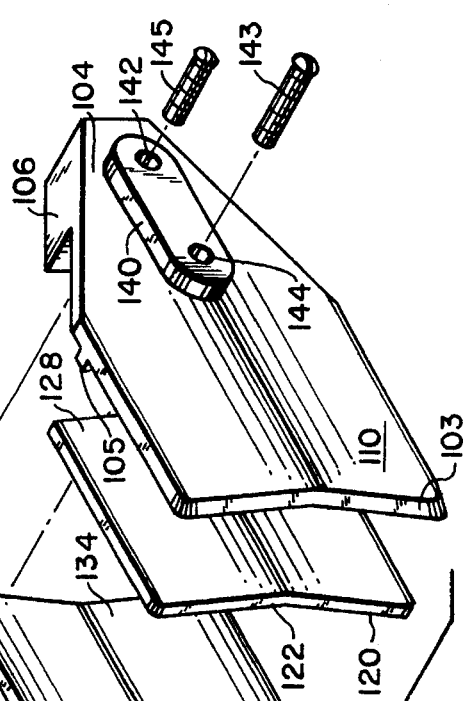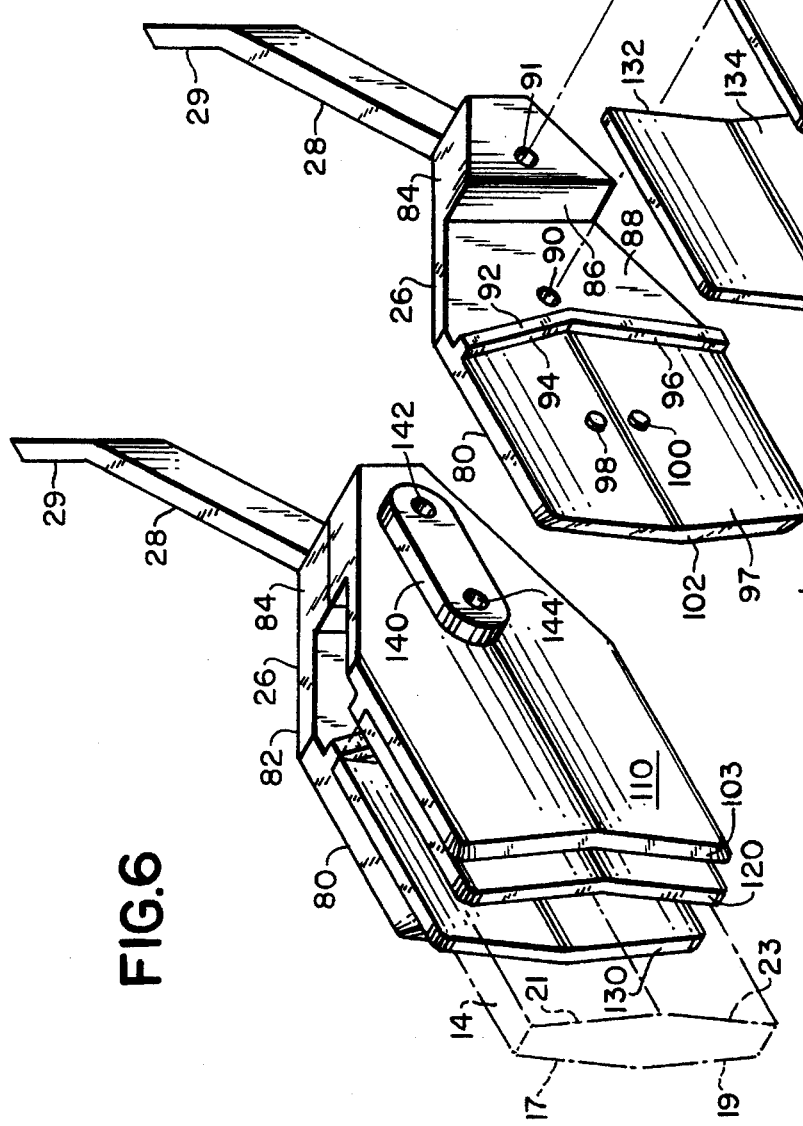

FISHING LINE DEVICE

BACKGROUND OF THE INVENTION

1. Field of the Invention

This invention relates to an apparatus used in fishing and more particularly a device for carrying a line release mechanism on an oar or paddle of a small boat in order to provide a jerking motion to a lure attached to the lower end of the line, and yet to provide for an automatic release of the line from the end of the oar when a strike takes place.

The device is attached to the outermost end of the paddle or oar with lure or bait trailing some distance behind the boat for the purpose of allowing the natural motion of rowing or paddling to impart a jerking motion to the trailing lure or bait.

It is well known that some species of fish are more inclined to strike a lure or bait moving in a jerking or darting fashion versus a consistent motion or no motion. The majority of the forward motion imposed on the lure or bait is derived from the return stroke from each full rowing motion. The person is offered the ability to vary the action of the lure or bait on each return stroke without affecting the speed of the boat or the energy output of the rower.

2. Prior Art

The closest prior art analogous to this invention that the applicant is aware of is U.S. Pat. No. 3,665,633 Scott which discloses fishing apparatus that allows one to use two poles at the same time and provides a cyclic swinging motion to each pole as well as a whipping action on the line at the free end. It is not manually operated nor is it attached to oars and takes up significant room in a small boat as well as requiring a cumbersome mechanical arrangement.

SUMMARY OF THE INVENTION

A special downrigger release device is mounted at the end of conventional oar in order to give a stop and go motion to the lure or bait attached to the end of the fishing line. A downrigger release is mounted at the end of an adapter attachment that is mounted to the oar. The purpose of this device is to give a jerky movement to the lure suspended from the downrigger line holder through the movement of the oar.

The downrigger release device at the end of the oar causes a jerking motion to be imparted to the line and lure or bait as the oar is manipulated particularly on the return portion of the stroke. A special clamp is placed at the end of the oar and extending outwardly and rearwardly of the oar with a pulley mechanism running out to the downrigger end of it. The downrigger is secured at the end and the line trails behind it.

A sleeve is loosely slid over the handle portion of the oar and placed on the shaft just outwardly of the handle on the oar shaft. A clamp arm is attached at the end of the paddle with the arm pointing towards the back of the boat and then it is centered on the paddle and the gripping bolts tightened. The sleeve on the shaft is then pulled towards the handle of the paddle in order to tighten the pulley lines. The oar is then secured to the boat, the release mechanism moved toward the paddle or blade portion of the oar using a pulley system. A user rows and pays out the desired amount of fishing line for the appropriate distance from the boat and depth. The fishing line is attached from the fishing boat to the release. While allowing for enough slack in the line, the release is moved to the outer end of the paddle and enough slack is maintained to allow the remote rowing motion without putting excessive strain on the fishing pole or the line. The fishing pole is retired to a leaning position in the boat or put into a pole holder. When a fish hits you will feel a tug on the paddle and then the line will pull from the release mechanism setting the hook, then pick up the fishing pole, and reel in the fish.

BRIEF DESCRIPTION OF THE DRAWING

Referring to the accompanying drawing which forms a part of this specification:

FIG. 5 is a perspective view of the clamp shown in FIG. 3;

FIG. 6 is an assembled view on the end of the oar of the attaching device portion of the apparatus of the present invention;

FIG. 7 is an expanded assembly view in perspective of the device of FIG. 6;

ILLUSTRATIVE SPECIFIC EMBODIMENT

Figure 1:
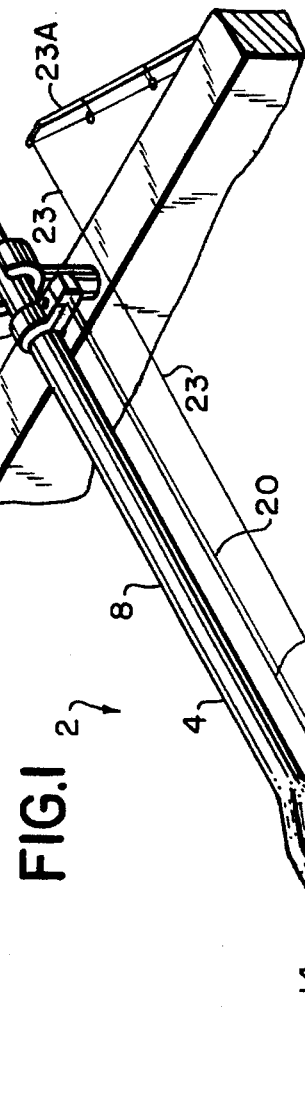
FIG. 1 is a general perspective view of the apparatus of the present invention attached to an oar mounted on a row boat gun whale.

The apparatus 2 of the present invention is shown mounted on a fishing boat gunwale 3 in FIG. 1.

The oar 4 is mounted in the oar lock 6 and includes main shaft 8, handle grip 12, and the paddle portion 14 terminating at the outer end 16.

A mounting bracket 18 for pulley lines 20 and 22 is shown secured to the shaft 10 outside the oar lock 6 with lines 20 and 22 extending to the downrigger clamp 24 secured at the outer pulley arm 29 of the mounting bracket 26.

Fishing line 23 depends from downrigger clamp 24 and has a hook 23B at the lower end thereof. The inner end portion of line 23 leads to a fishing rod 23A in the boat. Sufficient slack between 24 and the rod for the rowing motion is maintained.

Figure 4:
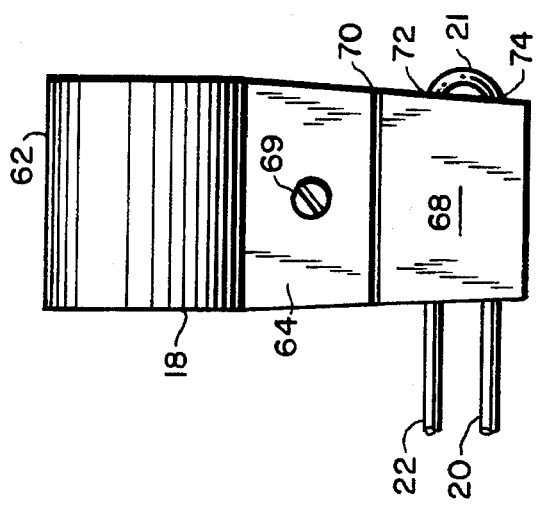
FIG. 4 is an end plan view of the special downrigger part of FIG. 2.
Figure 2:
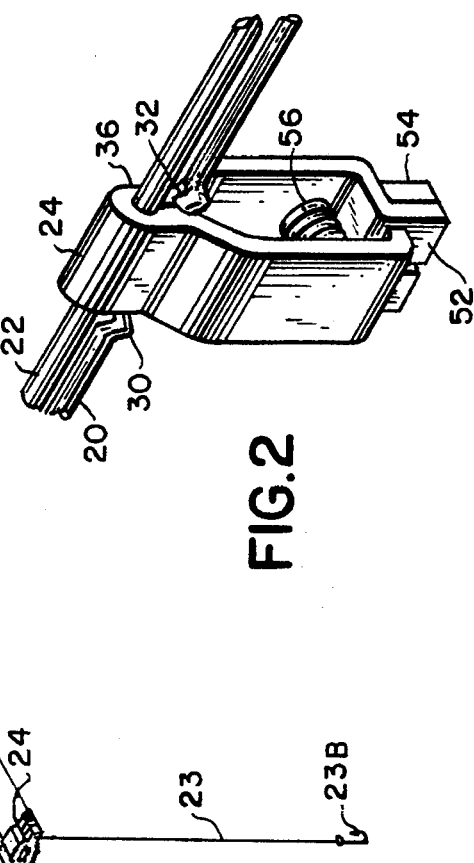
FIG. 2 is a perspective enlarged view of a portion of the apparatus.

Referring to FIGS. 2 and 4, downrigger clamp 24 is shown with the lines 20 and 22 passing through lateral recesses 40 and 42 respectively therein formed in bent over sides 36 and 38. Side 46 extends downwardly and outwards as shown at 46, straight down at 48, and turns inwardly forming a facing lip 50. The opposed side 38 extends similarly downwardly and outward at 47, side section 49 has an inwardly directed portion 51. The lower and opposed tab portions 52 and 54 respectively serve as clamping means with space for fishing line 23 in a known manner such as described in U.S. Pat. No. 4,698,933. The lower tab portions 52 and 54 of the inside of walls 36 and 38 are biased together by coil spring 56 set between, and acting against, wall sections 48 and 49.

Figure 8:
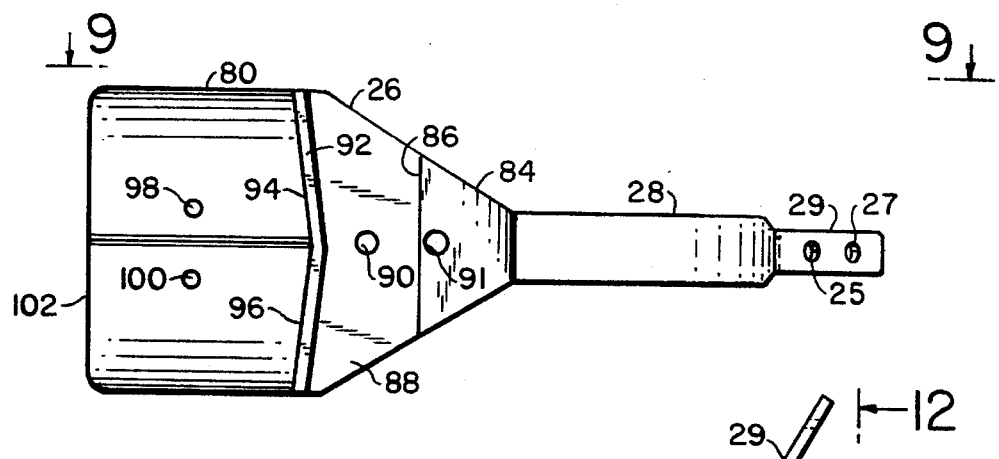
FIG. 8 is a bottom plan view of the main oar clamp component shown in FIGS. 6 and 7.
Figure 10:
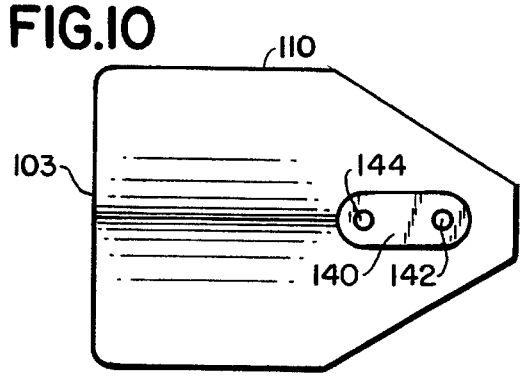
FIG. 10 is a top plan view of the clamp shown in FIGS. 6 and 7.
Figure 11:
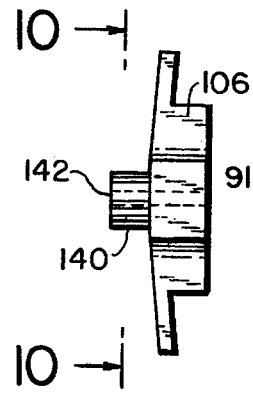
FIG. 11 is an end elevational view of the part of FIG. 10.
Figure 12:
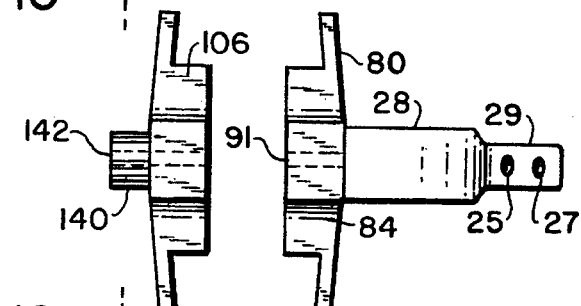
FIG. 12 is an end elevational view taken along lines 12—12 of FIG. 9.
Figure 13:
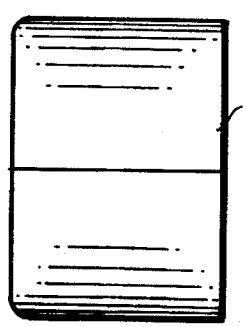
FIG. 13 is a plan view of one of the rubber pads, both of which are of the same construction, taken along lines 13—13 of FIG. 14.
Figure 14:
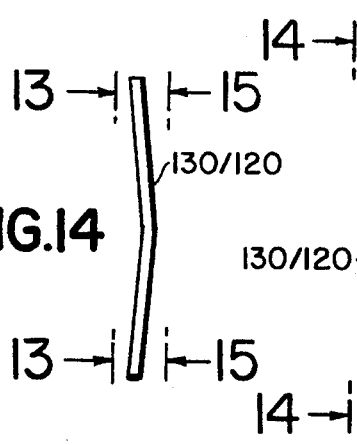
FIG. 14 is an end view of one of the rubber pads.
Figure 15:
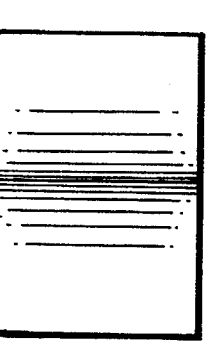
FIG. 15 is an opposite plan view along lines 15—15 of FIG. 14.

The holes 25 and 27, shown in FIGS. 8 and 10, in the arm end 29 are for passing the lines 20 and 22 respectively through it. The line 20 moves the downrigger clamp 24 in place by crimps 30 and 32 on either side of the device 24 on line 20.

Figure 3:
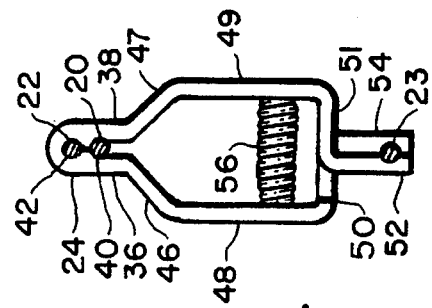
FIG. 3 is a side view of the pulley clamp.

Referring in particular to FIGS. 3 and 5, the mounting bracket 18 includes base portion 68 from which arm 60 extends upwardly which further extends upwardly forming the curved section 62. The section 62 which is sized to loosely fit around normal sized shaft 8 of oar 4 extends around and downwardly to bight portion 64 having aperture 66. A corresponding aperture 67 is formed in the side 60. A bolt 69 fits into aperture 66 and is threaded to the similar aperture 67 in section 60. The base 68 has bores 72 and 74 passing therethrough to hold the lines 22 and 20 respectively which loop around at 21. A bolt 69 is threaded through apertures 66 of parts 64 and 60 used to tighten mounting bracket clamp 18 to the oar shaft 8.

Referring to FIGS. 6 and 7 the assembly of the oar gripping bracket 26 on the oar 4 is shown in FIG. 6, and the various components are shown in expanded form in FIG. 7 with the details thereof in FIGS. 8–15.

The end 16 of the oar paddle 14 is bevelled along faces 17, 19, 21, and 23. The paddle 14 is gripped by the rubber pads 120 and 130 which are canted and pressed against the oar paddle 14 faces by the brackets parts 80 and 110 drawn together by bolts 143 and 145 passing through apertures 142, 144 in bracket part 110 and apertures 90 and 91 in bracket part 80.

Bracket part 80 extends from beveled outer end 102 and includes intermediate section 26 inwardly facing heel 84 and the arm 28 extending at a 30 degree angle from intermediate section 26. The end 102 of bracket part 80 is beveled as shown. Two protuberances 98 and 100 are on the inner face 88 thereof.

Corresponding bracket part 110 is similar except there is no arm extension. Reinforcement 140 has bores 142 and 144 going clear through with bolts 143 and 145 lined up with bores 90 and 91 in bracket part 80.

Intermediate the heel 84 and the end 102 of 26 is inwardly extending ridge 92 having canted portions 94 and 96 respectively and extending upwardly approximately 7/16 inches.

Pads 120 and 130 are comprised of rubber like material and have a cant inward and are gripped by protuberances 98 and 100 in the part 80 which extends upwardly about 3/16 inches and similar parts on the inner face of bracket part 110. The rubber part 120 is the same as pad 130. The parts 120 and 130 extend just beyond the ends 102 and 103 of bracket parts 80 and 110 respectively and are about 1/8 inch thick.

The downrigger clamp 24 of the release mechanism is a standard downrigger release such as shown in U.S. Pat. No. 4,698,933 other than having lines 20 and 21 going through the recesses 42 and 44. The line 20 is further secured to part 24 by line crimps 30 and 32 on either side as shown best in FIG. 2.

Figure 9:
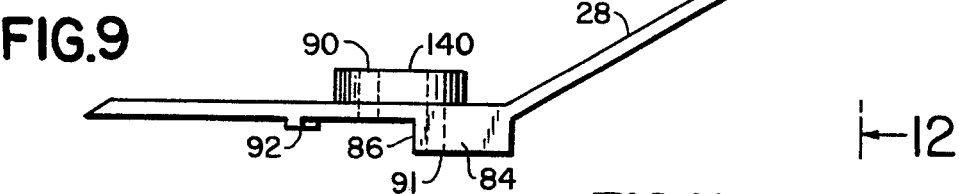
FIG. 9 is a side elevational view taken along line 9—9 of FIG. 8.

Referring to FIGS. 8 and 9 the arm 28 extending therefrom is at about a thirty degree angle and the extension 29 is also a thirty degree angle from arm 28. The bores 25 and 27 go through the extension 29 at a thirty degree angles so that when the downrigger clamp 24 is in place, the bores 25 and 27 are lined up with the bores 72 and 74 respectively in the clamp 18. The bores 90 and 91 line up with the bores 142 and 144.

Bolts 143 and 144 are utilized to bolt the part 110 to the part 80 and one set of bores may be threaded to receive the bolts or corresponding washers and nuts may be utilized if the bores are not threaded.

Most of the parts are readily molded from plastic material except for the pads 120 and 130 which are resilient rubber which are fairly firm in order to give a sure grip on the oar paddle 14.

While the invention has been described by reference to an illustrative embodiment, it is not intended that the novel device be limited thereby, but that modifications thereof are intended to be included as falling within the broad spirit and scope of the foregoing disclosure, the following claims and the appended drawings.

What is claimed is:

1. Apparatus for imparting an irregular jerking motion to a fishing line from a rowboat by releasably securing said fishing line to a downrigger clamp means located at the paddle portion end of an oar of said boat, said oar having a handle at one end and a paddle portion at the second end said apparatus comprising an attachment to said oar releasably secured to said paddle portion of said oar, a mounting bracket secured to said oar adjacent to said handle of said oar, a pulley arm holding a pulley line, said pulley arm extending from said attachment, said mounting bracket and said downrigger clamp means secured to said pulley line and crimp means on either side of said downrigger clamp means to secure said downrigger clamp means to said pulley line.

2. The apparatus as claimed in claim 1 wherein said downrigger clamp means may be pulled in to said oar handle and pulled out to said pulley arm by pulley line action.

* * * * *